US011725627B2

(12) United States Patent
Gupta et al.

(10) Patent No.: US 11,725,627 B2
(45) Date of Patent: Aug. 15, 2023

(54) DETUNER SYSTEM

(71) Applicant: Vestas Wind Systems A/S, Aarhus N. (DK)

(72) Inventors: Mranal Gupta, Tilst (DK); Erik Sloth, Rønde (DK)

(73) Assignee: Vestas Wind Systems A/S, Aarhus N (DK)

( * ) Notice: Subject to any disclaimer, the term of this patent is extended or adjusted under 35 U.S.C. 154(b) by 303 days.

(21) Appl. No.: 17/413,682

(22) PCT Filed: Dec. 17, 2019

(86) PCT No.: PCT/DK2019/050396
§ 371 (c)(1),
(2) Date: Jun. 14, 2021

(87) PCT Pub. No.: WO2020/125893
PCT Pub. Date: Jun. 25, 2020

(65) Prior Publication Data
US 2022/0065223 A1  Mar. 3, 2022

(30) Foreign Application Priority Data
Dec. 21, 2018 (DK) .......................... PA 2018 70854

(51) Int. Cl.
*F03D 7/02* (2006.01)
*F03D 15/00* (2016.01)

(52) U.S. Cl.
CPC ......... *F03D 7/0276* (2013.01); *F03D 7/0296* (2013.01); *F03D 15/00* (2016.05);
(Continued)

(58) Field of Classification Search
CPC ...... F03D 7/0276; F03D 15/00; F03D 7/0296; F05B 2260/4031; F05B 2260/966;
(Continued)

(56) References Cited

U.S. PATENT DOCUMENTS

2010/0013234 A1  1/2010  Sloth
2010/0320769 A1  12/2010  Miranda
(Continued)

FOREIGN PATENT DOCUMENTS

EP          3405390 A1    11/2018
WO      2012003832 A2     1/2012
(Continued)

OTHER PUBLICATIONS

Danish Patent and Trademark Office, Search and Examination Report in PA 2018 70854, dated Jun. 25, 2019.
(Continued)

*Primary Examiner* — Brandon D Lee
(74) *Attorney, Agent, or Firm* — Wood Herron & Evans LLP

(57) ABSTRACT

A detuner system for a wind turbine includes a drive train component having a natural frequency. The drive train component is configured to rotate about an axis of rotation at a range of different speeds. The detuner system includes a controller for selectively interacting with the drive train component and cause a step change in the natural frequency of the drive train component at a first threshold of the rotational speed range, and cause a step change in the natural frequency of the drive train component at a second threshold of the rotational speed range different to the first threshold.

16 Claims, 13 Drawing Sheets

(52) U.S. Cl.
 CPC ... *F05B 2260/4031* (2013.01); *F05B 2260/96* (2013.01); *F05B 2260/966* (2013.01); *F05B 2270/334* (2013.01); *F05B 2270/342* (2020.08)

(58) Field of Classification Search
 CPC .......... F05B 2270/334; F05B 2270/342; F05B 2260/96; Y02E 10/72
 See application file for complete search history.

(56) References Cited

U.S. PATENT DOCUMENTS

| | | |
|---|---|---|
| 2013/0189100 A1 | 7/2013 | Muraszewski et al. |
| 2013/0189105 A1 | 7/2013 | Bonnet |
| 2013/0280064 A1* | 10/2013 | van Steinvoren ....... F03D 13/35 416/1 |
| 2014/0327243 A1 | 11/2014 | Demtroder |

FOREIGN PATENT DOCUMENTS

| | | |
|---|---|---|
| WO | 2017036481 A1 | 3/2017 |
| WO | 2017125489 A1 | 7/2017 |

OTHER PUBLICATIONS

European Patent Office, International Search Report and Written Opinion in PCT Application No. PCT/DK2019/050396, dated Mar. 19, 2020.
European Patent Office, Examination Report issued in corresponding EP Application No. 19823904.8, dated Feb. 10, 2023.

\* cited by examiner

DETUNER SYSTEM

FIELD OF THE INVENTION

The present invention relates to a detuner system for a wind turbine, a wind turbine comprising the detuner system, and a method of operating a wind turbine.

BACKGROUND OF THE INVENTION

A wind turbine converts wind power into electrical energy using the aerodynamic force on its blades to operate a generator via a series of drive train components. As the various components of the wind turbine rotate structural borne noise is generated due to the vibrations of these mechanical parts, for example vibrations can be generated from tooth meshing between gears.

The vibrations are transferred to the wind turbine and emitted as noise by the wind turbine structure, for example by the tower or blades, and at certain frequency bands (tonalities) the noise, if left unchecked, could reach unacceptable levels and also generate undesirable loads.

The effects of these vibrations are particularly evident at resonant frequencies where the vibrations are amplified.

SUMMARY OF THE INVENTION

A first aspect of the invention provides a detuner system for a wind turbine, comprising: a drive train component having a natural frequency and configured to rotate about an axis of rotation at a range of different speeds; and a controller for selectively interacting with the drive train component, wherein the controller is configured to cause a step change in the natural frequency of the drive train component at a first threshold of the rotational speed range, and to cause a step change in the natural frequency of the drive train component at a second threshold of the rotational speed range, wherein the rotational speed range at the second threshold is different to the rotational speed at the first threshold.

A further aspect of the invention provides a wind turbine comprising the detuner system according to the first aspect.

A further aspect of the invention provides a method of operating a wind turbine, the wind turbine comprising: a drive train component having a natural frequency and configured to rotate about an axis; and a controller for selectively interacting with the drive train component, the method comprising: rotating the drive train component about the axis at a range of different speeds; causing a step change in the natural frequency of the drive train component at a first threshold of the rotational speed range; and causing a step change in the natural frequency of the drive train component at a second threshold of the rotational speed range different to the first threshold.

The controller is arranged to selectively interact with the drive train component at at least the first and second thresholds of the rotational speed range to cause the step changes in the natural frequency. The controller may include fully active or partially active control elements. In other words, the controller may be configured to regulate or command the step change in the natural frequency of the drive train component. The detuner system allows particular frequencies and frequency bands, such as resonant frequencies, to be avoided, damped or cancelled. This can reduce the noise emitted by the wind turbine. The detuner system may be activated only when it is required and without interrupting the continued operation of the wind turbine.

The controller may be configured to cause a change in the natural frequency by altering one or more of the: mass, mass moment, stiffness, and/or damping of at least a portion of the drive train component. For example, the controller may be coupled to an actuator or effector for moving a mass or changing the stiffness or other property of a component of the system so as to cause the change in the natural frequency.

The natural frequency of the drive train component below the first threshold of the rotational speed range and/or above the second threshold of the rotational speed range may be constant.

The first threshold and/or second threshold of the rotational speed range may be configured to be determined based on the operational power of the wind turbine.

The first threshold and/or second threshold of the rotational speed range may be configured to be determined prior to rotating the drive train component.

The first threshold and/or second threshold of the rotational speed range may be configured to be determined based on a threshold vibrational amplitude of the rotating drive train component.

The detuner system may comprise two or more threshold vibrational amplitudes of the rotating drive train component.

A limited band of the rotational speed may be defined between the first threshold and the second threshold of the rotational speed range. The detuner system may comprise two or more limited bands of the rotational speed range.

The detuner system may comprise a mass for interacting with the drive train component, wherein the controller is configured to enable movement of the mass relative to the drive train component.

The mass may be configured to move radially with respect to the axis of the drive train component.

The mass may be configured to move axially along the axis of the drive train component.

The natural frequency between the first and second thresholds of the rotational speed range may be altered. Alternatively, the natural frequency may be constant between the first and second thresholds of the rotational speed range.

A position of the mass relative to the drive train component at a speed below the first threshold of the rotational speed and at a speed above the second threshold of the rotational speed may be substantially the same.

The mass may be a solid or a liquid.

The natural frequency may be a torsional natural frequency and/or a bending natural frequency.

The detuner system may comprise a high-speed shaft and a low-speed shaft, wherein the controller is configured to interact with the high-speed shaft.

BRIEF DESCRIPTION OF THE DRAWINGS

Embodiments of the invention will now be described with reference to the accompanying drawings, in which.

DETAILED DESCRIPTION OF EMBODIMENT(S)

Natural frequency is the frequency that a system tends to oscillate at in the absence of any external forces.

A step change may be a significant change in the natural frequency such that there is a notable, significant change in the natural frequency of the drive train component. The step change may occur over a short time period, e.g. of the order of 1 second or less.

Figure 1:
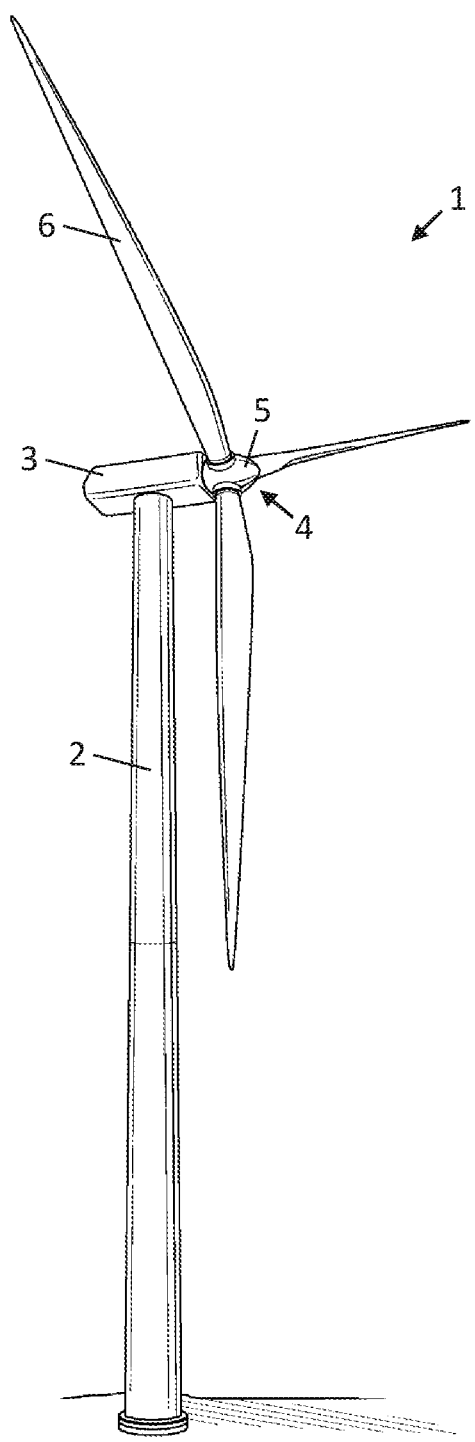
FIG. 1 shows a wind turbine.

FIG. 1 shows a wind turbine 1 including a tower 2 mounted on a foundation and a nacelle 3 disposed at the apex of the tower 2. The wind turbine 1 depicted here is an onshore wind turbine such that the foundation is embedded in the ground, but the wind turbine 1 could be an offshore installation in which case the foundation would be provided by a suitable marine platform.

A rotor 4 is operatively coupled via a gearbox to a generator housed inside the nacelle 3. The rotor 4 includes a central hub 5 and a plurality of rotor blades 6, which project outwardly from the central hub 5. It will be noted that the wind turbine 1 is the common type of horizontal axis wind turbine (HAWT) such that the rotor 4 is mounted at the nacelle 3 to rotate about a substantially horizontal axis defined at the centre at the hub 5. While the example shown in FIG. 1 has three blades, it will be realised by the skilled person that other numbers of blades are possible.

When wind blows against the wind turbine 1, the blades 6 generate a lift force which causes the rotor 4 to rotate, which in turn causes the rotation of components within the drive train 10 in order to allow a generator 16 within the nacelle 3 to generate electrical energy.

Figure 2:
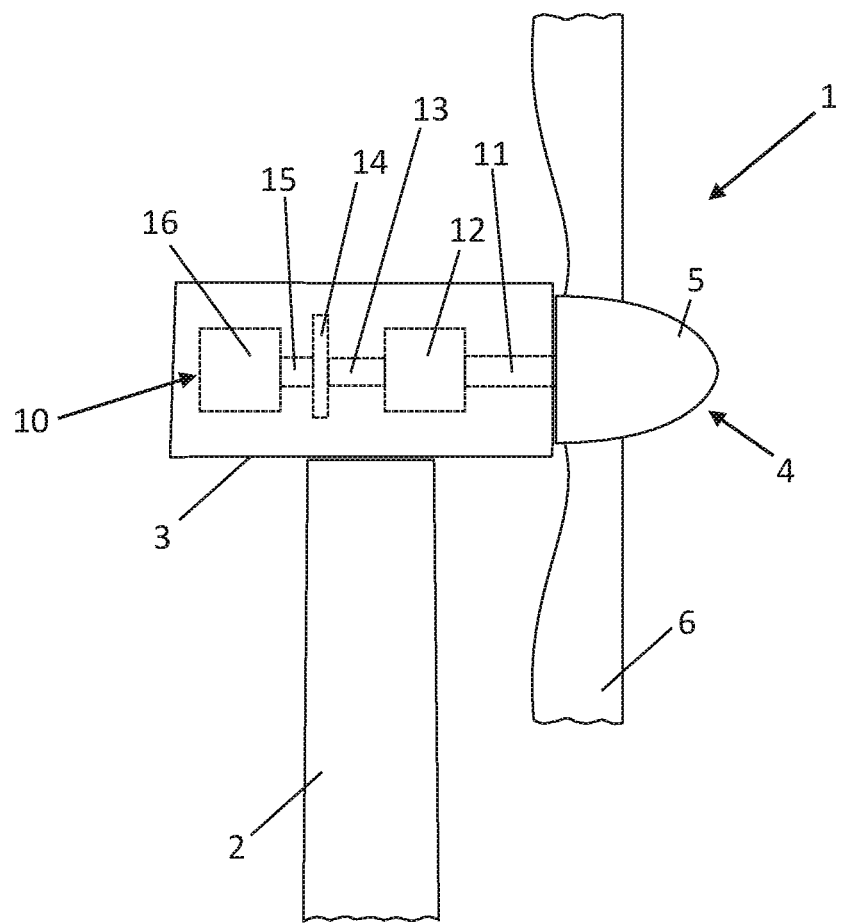
FIG. 2 shows a drive train inside a nacelle.

FIG. 2 shows the drive train 10 inside the nacelle 3 of a wind turbine 1. The drive train 10 includes a series of components connected between the rotor 4 and a generator 16. The drive train 10 includes an input shaft 11 (low speed shaft) attached between the rotor 4 and a gearbox 12, an output shaft 13 (high speed shaft) downstream of the gearbox 12, a brake 14 coupled between the output shaft 13 and an auxiliary shaft 15, and a generator 16 coupled to the auxiliary shaft 15, such that a mechanical driving force is transferred from the rotor 4 to the generator 16 to generate electricity.

As a result of the relative mechanical motion between parts, vibrations are generated, for example due to misalignment between the drive train 10 components. A significant source of mechanical noise is the gearbox 12, which can cause vibrations due to imperfections in the gear shape and pitch. Vibrations are also an inherent characteristic of any moving system with multiple components that move relative and are in contact with each other. The vibrations can produce audible noises (structural borne noise) at certain frequencies and/or discrete frequency bands (tonalities), particularly at the resonant frequencies of the drive train components.

Figure 3A:
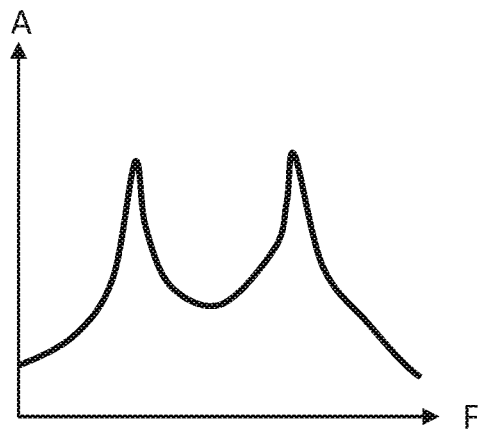
FIG. 3a shows a frequency response of a vibrational source of a drive train component of the wind turbine.

The amplitude A (or response) of the vibrations generated by the components of the drive train 10 are dependent upon the rotational frequency F (or speed) of the drive train component, and may include one or more resonant frequencies, as shown in FIG. 3a depicting the response at a variety of frequencies/speeds at the source of the vibrations. The resonant frequency can be a torsional resonant frequency or a bending resonant frequency. These vibrational responses are then propagated directly from the component into the air.

Figure 3B:
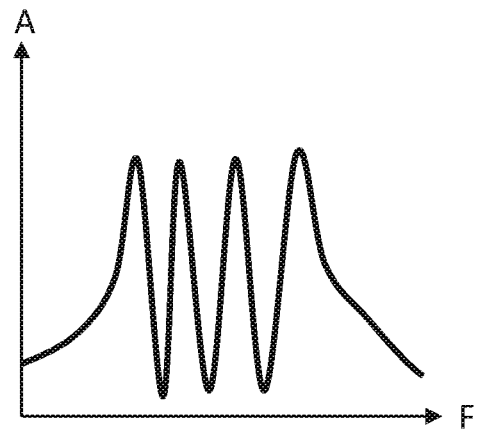
FIG. 3b shows a transmitted vibrational response within the wind turbine.

The vibrational response may be transmitted to another component of the wind turbine, as shown in FIG. 3b depicting the response at a variety of frequencies/speeds at the other wind turbine component. In the process the vibrational response may change (as compared with the response at the source), for example the amplitude A of each resonant peak may decrease or increase, and the number of resonant peaks may increase or decrease.

Figure 3C:
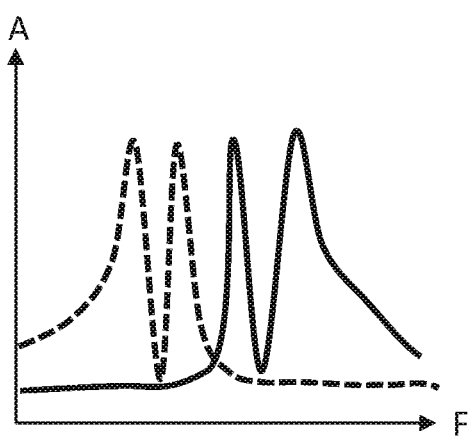
FIG. 3c shows a radiated vibrational response radiated from the wind turbine structure.

The transmitted vibrational response may then be radiated by a surface of the wind turbine, such as the tower 2, nacelle 3, or blades 6 for example—so called 'structure borne noise' or SBN. As shown in FIG. 3c the radiating surface will have resonant frequencies (broken line and solid line) which may combine with the transmitted vibrational response (solid line in FIG. 3b), to produce the depicted response of FIG. 3d at a variety of frequencies/speeds at the radiating surface.

Whilst vibrations of components of the drive train 10 are mostly unavoidable, they may not be a problem. For example, if the source vibration level is low there may be no appreciable tonality. Even if the source vibration level is high, it may not be effectively transmitted into the other component(s) of the wind turbine, resulting in no appreciable tonality. Even if the source vibration level is high, and it is effectively transmitted into the other component(s) of the wind turbine, it may not be effectively radiated from a surface of the wind turbine, resulting in no appreciable tonality.

Figure 3D:
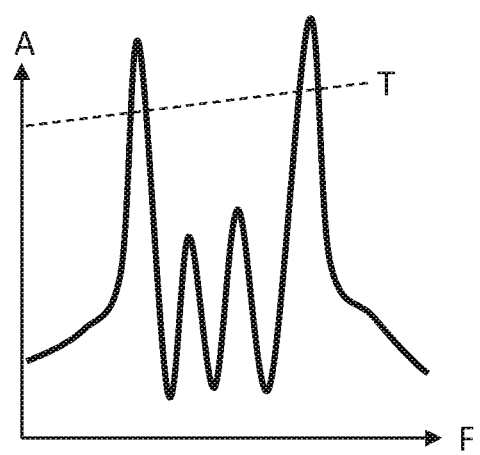
FIG. 3d shows a radiated vibrational response observed at a receiver away from the wind turbine.

However, at certain rotational speeds of the components of the drive train 10 the source vibration level may be high and may be effectively transmitted into another component of the wind turbine and may be effectively radiated from a surface of the wind turbine, resulting in appreciable tonality. As shown in FIG. 3d, the amplitude A of the resultant noise, or tonal audibility, received at a microphone or receiver (not shown) some distance away from the wind turbine may be greater than an acceptable threshold T, or 'tone line level'. The threshold T may be different at different rotational speeds. There may be more than one threshold T, i.e. multiple tone line levels. Each threshold may be tailored for different scenarios, such as operational importance, wind turbine location and weather conditions.

This invention generally relates to avoiding or cancelling the amplitude peaks above the tone line level or threshold T at the receiver by changing the natural frequency of one or more components of the drive train 10 for a limited band of the rotational speed of the component(s). The limited band of the rotational speed is defined between a first threshold of the rotational speed range and a second threshold of the rotational speed range of components of the drive train 10. Tonality is caused by vibration sources which excite system resonances to radiate tones. When an excitation source crosses a resonance frequency of a component the amplitudes are significantly amplified.

The natural frequency is a system characteristic that depends on the mass, mass moment, stiffness, and damping of a component or components. The dependence of the natural frequency on each of these parameters may vary, for example, depending on the structure of the drive train components, the interaction of components of the wind turbine, and the type of natural frequency (e.g. bending or torsional natural frequency).

Figure 4:
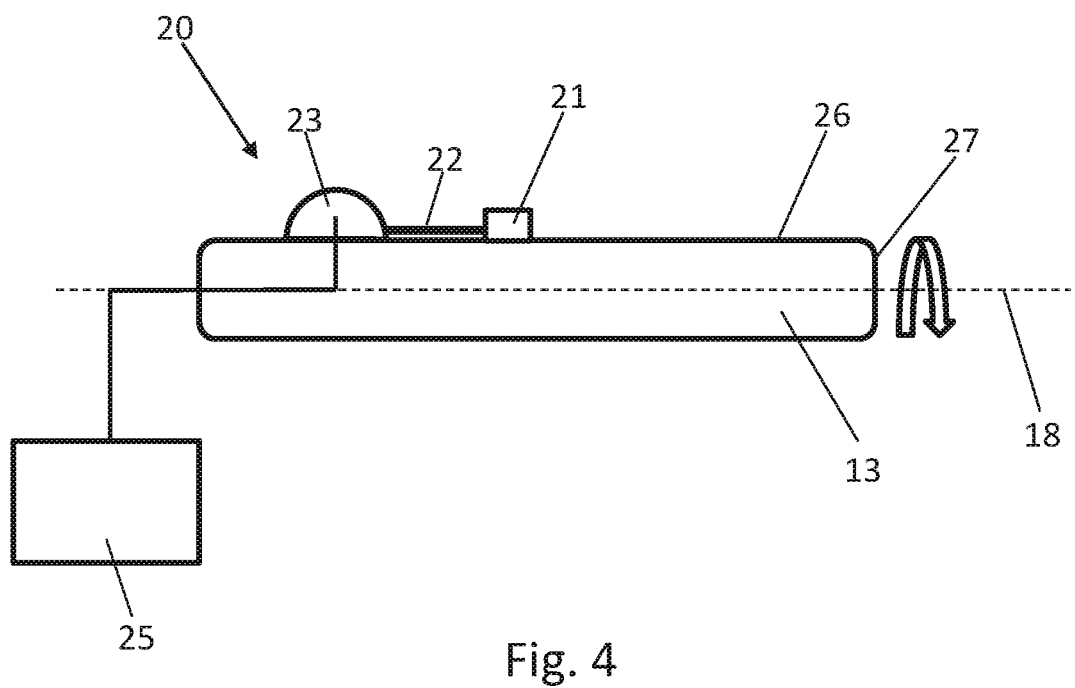
FIG. 4 shows a detuner system attached to an output shaft.
Figure 5:
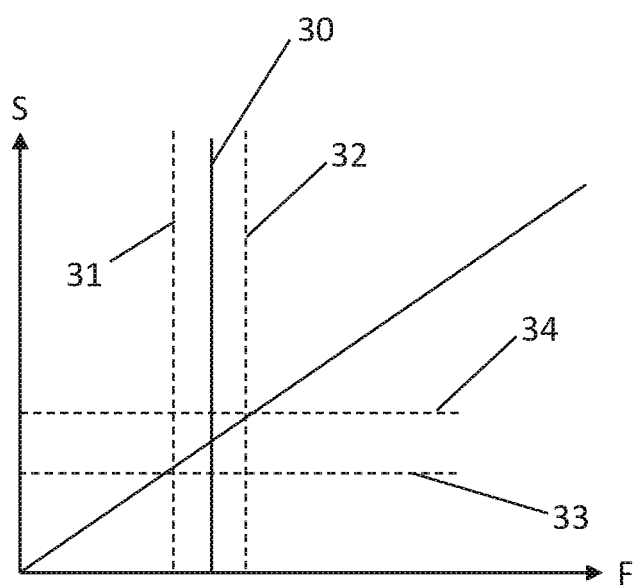
FIG. 5 shows a relationship between rotational speed and vibrational frequency.

FIG. 4 shows a detuner system 20 attached to a rotating shaft, e.g. the output shaft 13 of the drive train 10. The output shaft 13 is rotatable about an axis of rotation 18. The detuner system 20 may be a tonality detuner, which is a device which is used to jump or avoid resonances during operation without impacting the operation, e.g. of the drive train 10. The detuner system 20 includes a mass 21 coupled to an actuator 23 by a lever 22, with movement of the mass 21 relative to the output shaft 13 being controlled by a controller 25 connected to the actuator 23. The actuator 23 is attached to an outer radial face 26 of the drive train component. When the output shaft 13 rotates about the axis of rotation 18, the output shaft 13 vibrates at a frequency F dependent on the speed of rotation S of the output shaft 13. This F/S excitation relationship is approximately linear, as shown in FIG. 5.

At a certain speed of rotation S of the output shaft 13, the vibrational frequency F matches a resonance frequency 30 of the output shaft 13. At this resonance frequency 30 there is a significant increase in the amplitude of the vibrational excitation of the output shaft 13, which may be transmitted through the wind turbine and result in a significant increase in the tonal noise emitted or radiated by a surface of the wind turbine. The tonal noise observed at a receiver can increase above an acceptable threshold amplitude across a band of frequencies, such that a lower frequency bound 31 and an upper frequency bound 32 on either side of the resonance frequency 30 are defined. A lower rotational speed bound 33 and an upper speed rotational bound 34 can be defined, within which the vibrations of the output shaft 13 lie within the band of frequencies bounded by the lower frequency bound 31 and the upper frequency bound 32.

Figure 6:
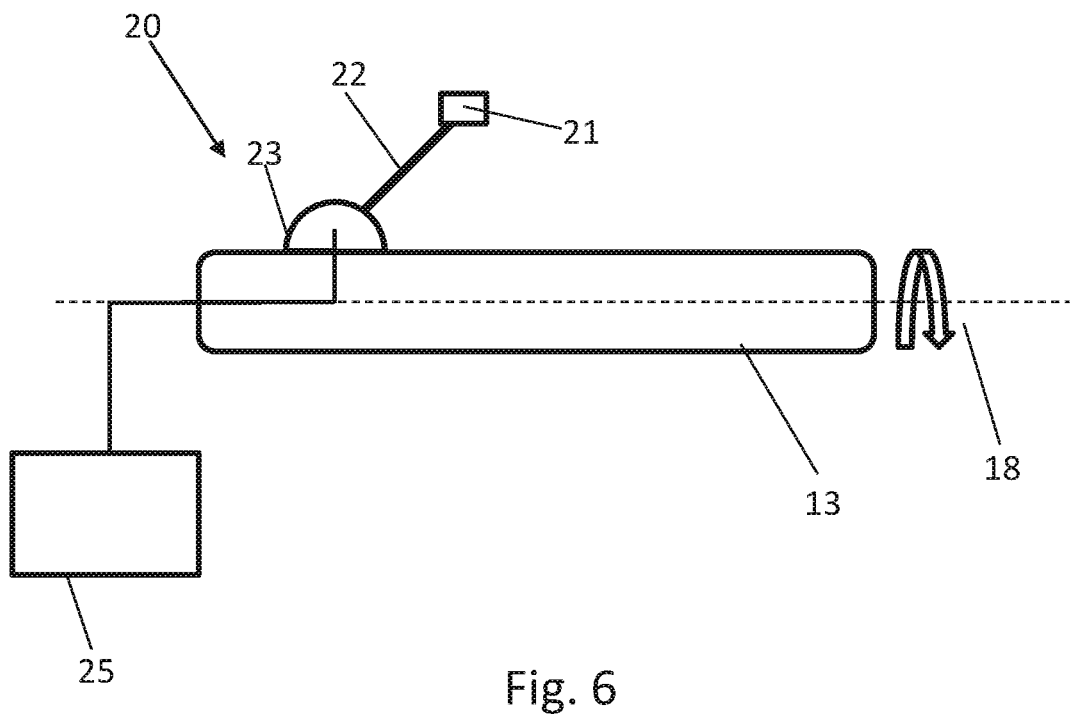
FIG. 6 shows a detuner system interacting with an output shaft.

The natural frequency 30 of the output shaft 13 can be changed, e.g. by altering the mass distribution or inertial properties or stiffness or damping of the output shaft 13, such that the rotational speed of the output shaft at which resonance occurs is shifted to a lower or higher rotational speed. The effect of causing a change in the natural frequency of the output shaft 13 is that the natural frequency of adjacent components of the drive train 10 and the wind turbine 1 as a whole may also be altered. In the example shown in FIG. 6 the inertia of the output shaft 13 is increased or decreased when the rotational speed gets close to exciting the resonance such that the resonance is at a higher or lower frequency. When the speed has passed the resonance frequency, i.e. is outside the speed band bounded by the lower rotational speed bound 33 and the upper rotational speed bound 34, the inertia is put back to normal. In the example shown in FIG. 6, the mass 21 is moved to change the inertia of the output shaft 13. The mass 21 in this example is moved radially and axially with respect to the axis of rotation 18 of the output shaft 13 by the actuator 23. The motion of the mass 21 on the lever arm 22 about the actuator 23 causes the torsional natural frequency and the bending natural frequency to change.

Figure 7:
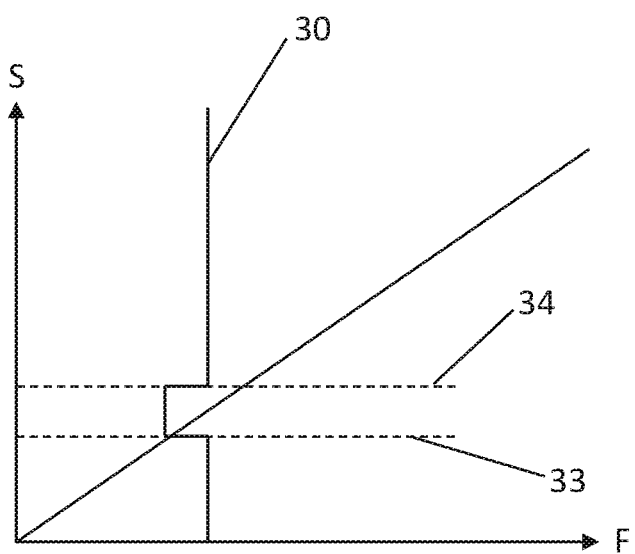
FIG. 7 shows a relationship between rotational speed and vibrational frequency when the detuner system interacts with the output shaft over a limited band of the rotational speed range.

The actuation of the mass 21 is controlled by a controller 25 connected to the actuator. The natural frequency of the output shaft 13 is altered for a limited band of the rotational speed range. In the example shown in FIG. 7, the mass 21 is moved from a first position (shown in FIG. 4) to a second position (shown in FIG. 6) at a lower bound (first threshold) 33 of the limited band of the rotational speed range, and then the mass 21 is moved from the second position (FIG. 6) back to the first position (FIG. 4) at an upper bound (second threshold) 34 of the rotational speed range, such that the vibrational frequency of the output shaft 13 is different to the natural frequency of the output shaft 13 within the limited band. The output shaft 13 has a first natural frequency at the first position (FIG. 4) of the mass 21, and a second natural frequency at the second position (FIG. 6) of the mass 21.

The detuner system 20 is able to selectively alter a natural frequency of the drive train components in order to jump/avoid resonant frequencies, without affecting the operation of the wind turbine 1.

Figure 8A:
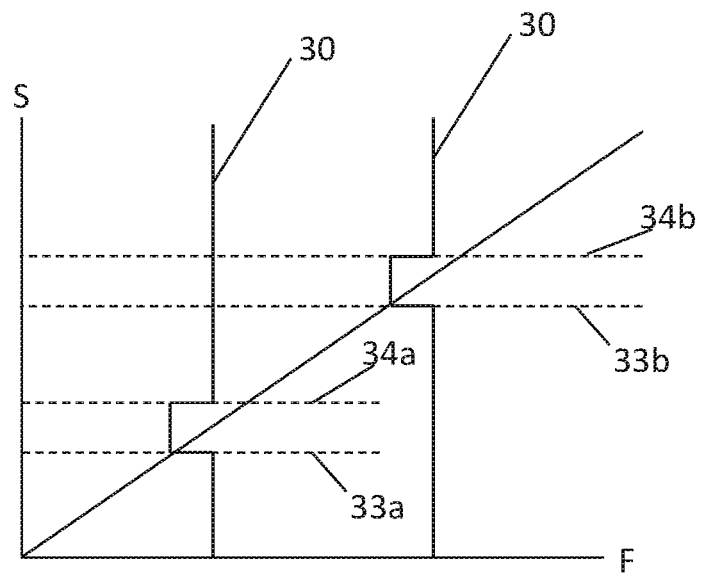
FIG. 8a shows a relationship between rotational speed and vibrational frequency with two limited bands of the rotational speed.

In an alternative example shown in FIG. 8a, there are two resonant frequencies of the component that is the source of the vibration, e.g. the output shaft 13, within the rotational speed range. In this case, two limited bands of the rotational speed range are defined. The mass 21 is moved from a first position to a second position at a lower bound (first threshold) 33a of the first limited band of the rotational speed range. Then the mass 21 is moved from the second position back to the first position at an upper bound (second threshold) 34a of the first rotational speed range. The mass 21 is then maintained at the first position until the rotational speed is increased up to the lower bound (first threshold) 33b of the second rotational speed range, at which point the process repeats between the lower bound (first threshold) 33b and upper bound (second threshold) 34b of the second rotational speed range. The advantage is that this allows multiple resonant frequencies to be targeted by the detuner system without changing the natural frequency over an extended frequency range between the two resonant frequencies.

Figure 8B:
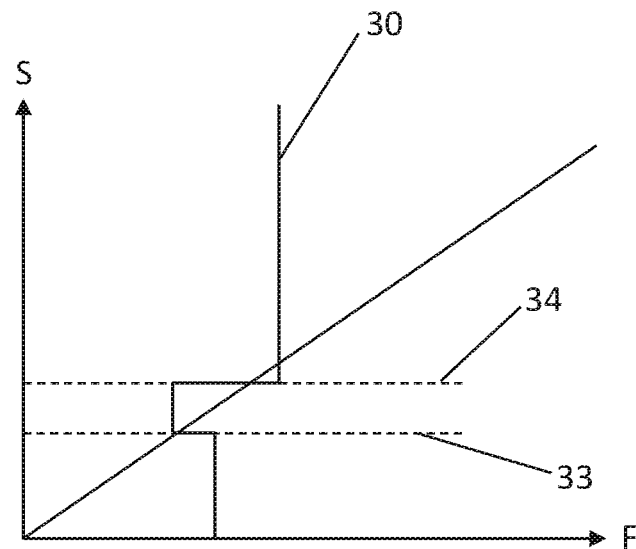
FIG. 8b shows a relationship between rotational speed and vibrational frequency with different natural frequencies below the first threshold and above the second threshold.

In an alternative example shown in FIG. 8b, the natural frequency below the first threshold of the rotational speed range and the natural frequency above the second threshold of the rotational speed range may be different.

Figure 9A:
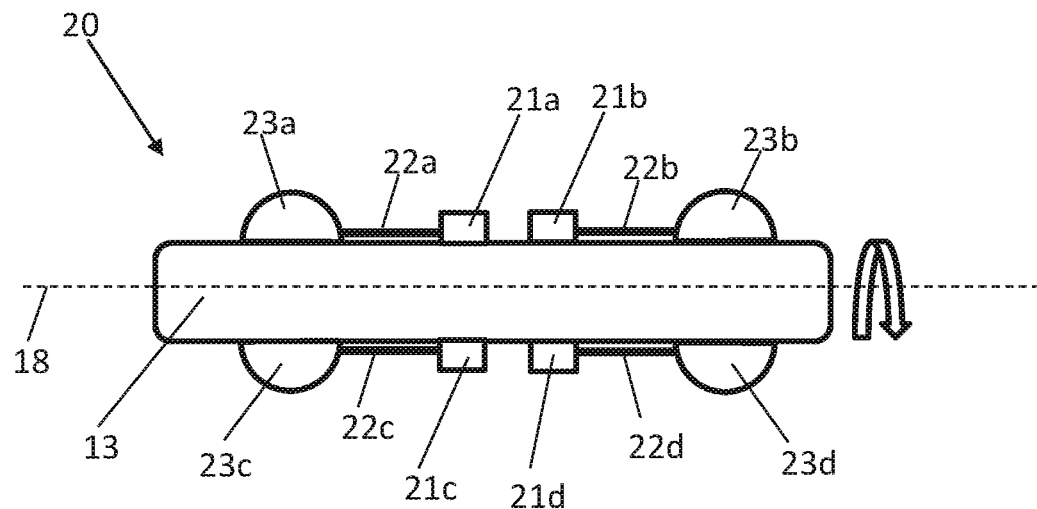
FIG. 9a shows a detuner system attached to an output shaft.

In a further example, the drive train component may have more than one mass 21 able to actuate relative to the drive train component. For example, FIG. 9a shows a detuner system 20 including four masses 21a, 21b, 21c, 21d attached to the output shaft 13. The output shaft 13 is rotatable about the axis of rotation 18. Each mass 21a, 21b, 21c, 21d of the detuner system 20 is coupled to a respective actuator 23a, 23b, 23c, 23d by a lever 22a, 22b, 22c, 22d. As in the previous examples, movement of the mass 21 relative to the output shaft 13 is controlled by a controller (not shown) connected to the actuator 23.

Figure 9B:
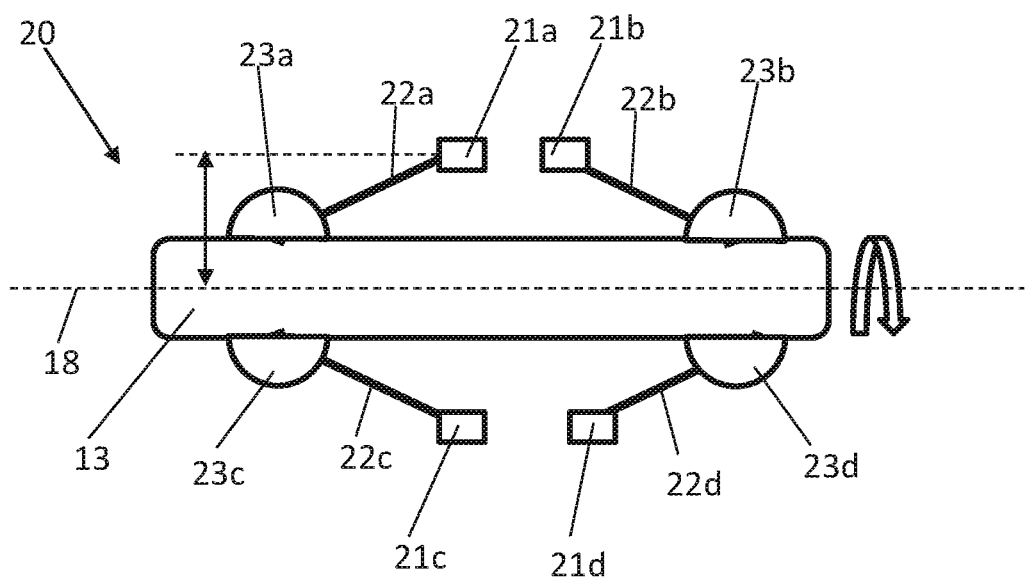
FIG. 9b-h shows a detuner system interacting with an output shaft.
Figure 9C:
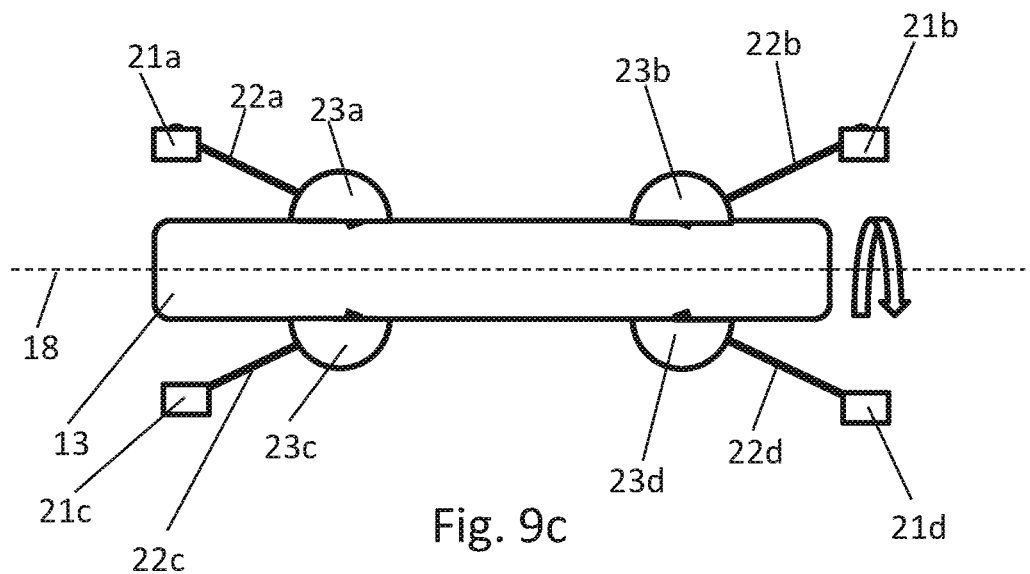

When the output shaft 13 rotates about the axis of rotation 18, the output shaft 13 vibrates at a frequency F dependent on the speed of rotation S of the output shaft 13. The vibrations can contribute to the resonance of the output shaft 13 and the system as a whole. Movement of the four masses 21 provides increased options to change the natural frequency of the output shaft 13 and the system as a whole. For example, FIG. 9b shows a configuration in which all four masses 21a-d are actuated about the axis of the actuator 23a-d through an acute angle, FIG. 9c shows a configuration in which all four masses 21a-d are actuated about the axis of the actuator 23a-d through an obtuse angle. In the examples shown in FIGS. 9b and 9c the masses 21a-d are positioned at the same radial distance from the axis of rotation 18 of the output shaft 13 but different axial locations along the axis of rotation 18, and therefore would be expected to have a substantially equivalent affect upon the torsional natural frequency but a different affect upon the natural bending frequency.

Figure 9D:
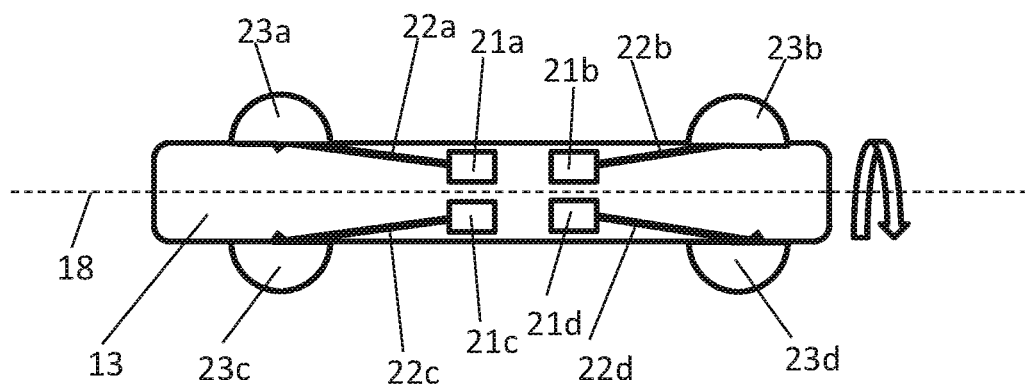

The masses 21a-d may be actuated towards the axis of rotation 18 of the output shaft 13, as shown in FIG. 9d. This may require cut-outs or fillets (not shown) to be made in the output shaft 13 to accommodate the masses 21a-d.

Figure 9E:
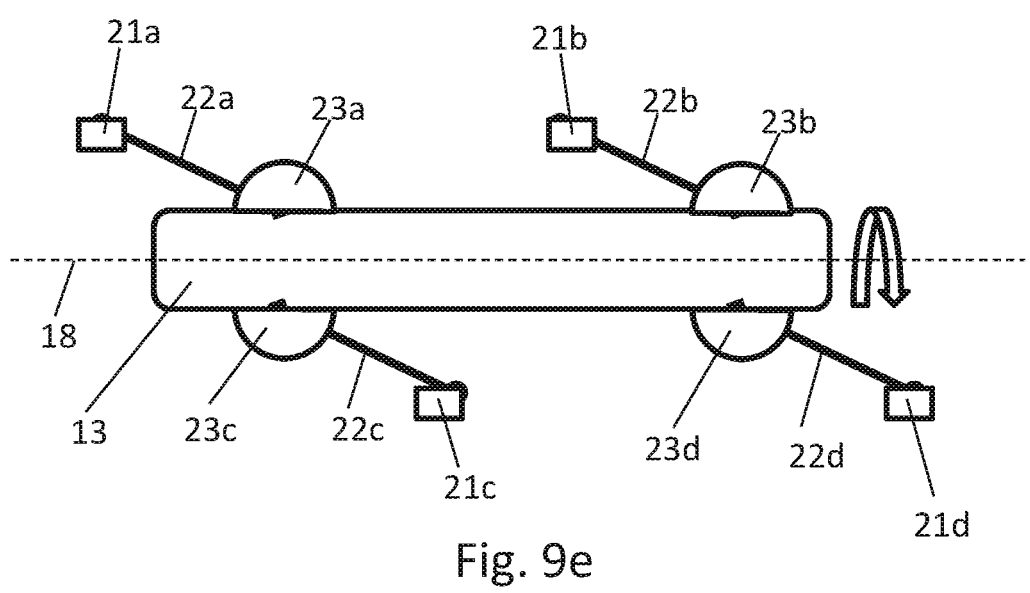
Figure 9F:
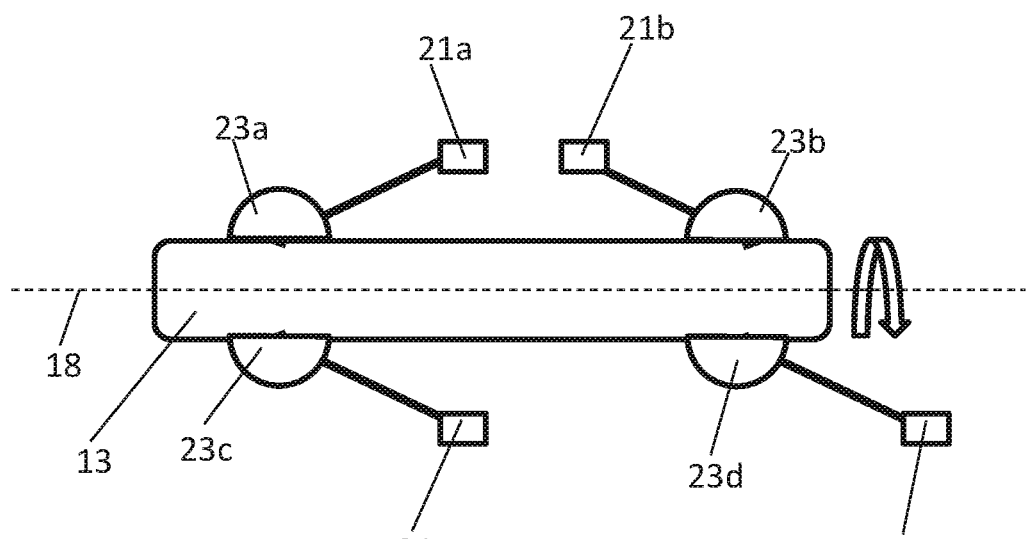

Each of the masses 21a-d may be actuated to different axial positions along the axis of rotation 18. For example, FIG. 9e shows a configuration in which a first mass 21a and a fourth mass 21d are moved axially further outboard of their respective actuators 23a,d in comparison to a second mass 21b and a third mass 21c. In FIG. 9f, an example is shown in which a first mass 21a, a second mass 21b, and a third mass 21c are all positioned axially inboard of their respective actuators 23a,b,c, but a fourth mass 21d is positioned axially outboard of its actuator 23d.

Figure 9G:
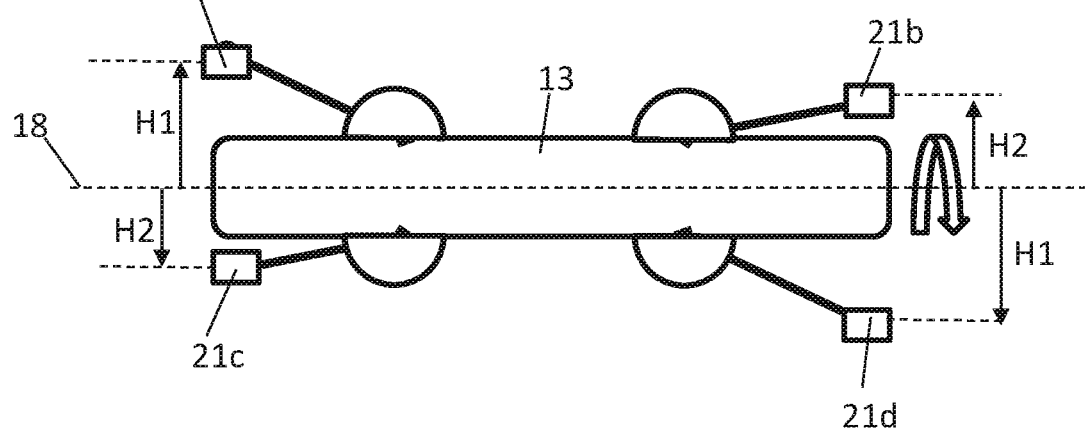
Figure 9H:
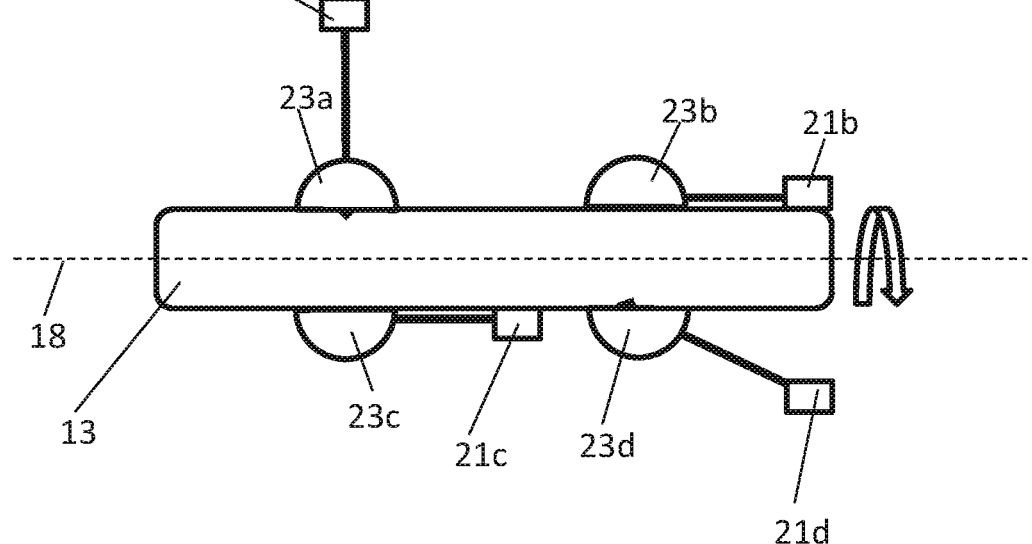

The masses 21a-d may also be positioned at different radial positions relative to the axis of rotation 18. For example FIG. 9g shows an example in which the first mass 21a and fourth mass 21d are positioned at a first radial distance H1 from the axis of rotation 18, and the second mass 21b and third mass 21c are positioned at a second radial distance H2 from the axis of rotation, wherein the second radial distance H2 is smaller than the first radial distance H1. FIG. 9h shows an example in which the first mass 21a is at a maximum radial extent of the lever 22a, the lever 22b of the second mass 21b is oriented to be parallel to the axis of rotation 18 but with the second mass 21b positioned axially outboard of its actuator 23b, the lever 22c of the third mass 21c is oriented to be parallel to the axis of rotation 18 but with the third mass 21c positioned axially inboard of its actuator 23c, and the fourth mass 21d is positioned at a radial position between the maximum and minimum extent of the lever 23d.

Each configuration may be arranged to target a specific frequency or be tailored for a specific mode of operation. In both the configurations with one mass 21, or configurations with a plurality of masses 21, the radial and axial position of each mass 21 can be tailored to selectively alter the bending and/or torsional natural frequency of the drive train component.

In the previous examples the drive train component is an output shaft 13. The invention is particularly applicable to the output shaft 13 due to the relative high speed of rotation of this component (with respect to other drive train components). This means that the mass can be smaller, or the effects of an equivalent mass amplified. However, it will be understood that the invention is also applicable for use on any other rotating part of the drive train 10, for example, the input shaft 11, the gearbox 12 (or one or more of its gears), the brake 14, the auxiliary shaft 15, the generator 16, the non-drive end of the generator, or any other suitable component known in the art. In an alternative example, the wind turbine 1 may not comprise a gearbox. In this case, the drive train component may be a component of a direct drive turbine system.

Figure 10A:
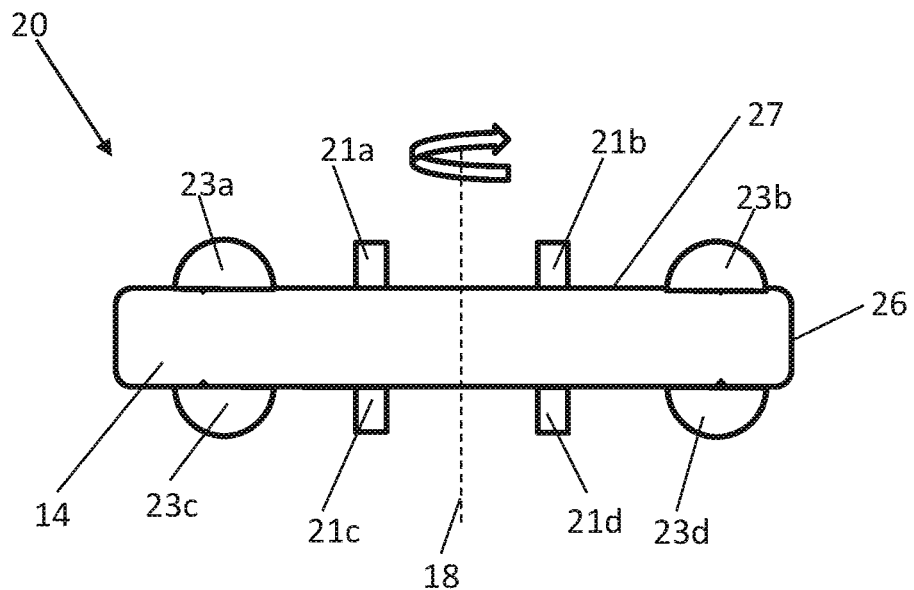
FIG. 10a shows a detuner system attached to a brake.
Figure 10B:
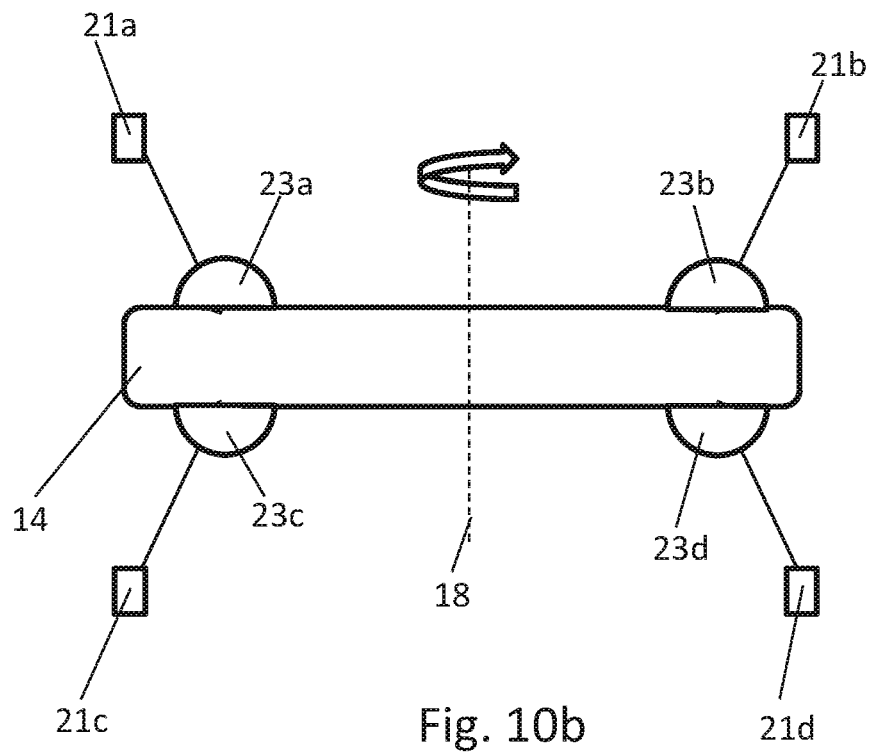
FIG. 10b shows a detuner system interacting with a brake.

In the previous examples, the actuator 23 is positioned on an outer radial face 26 of the output shaft 13 that is parallel to the axis of rotation. In an alternative example, the actuator 23 may be positioned on a radial edge 27 of the drive train component perpendicular to the axis of rotation 18. This may be particularly suitable for disc-like components of the drive train, such as the brake 14, as shown in FIGS. 10a-10b.

Figure 11A:
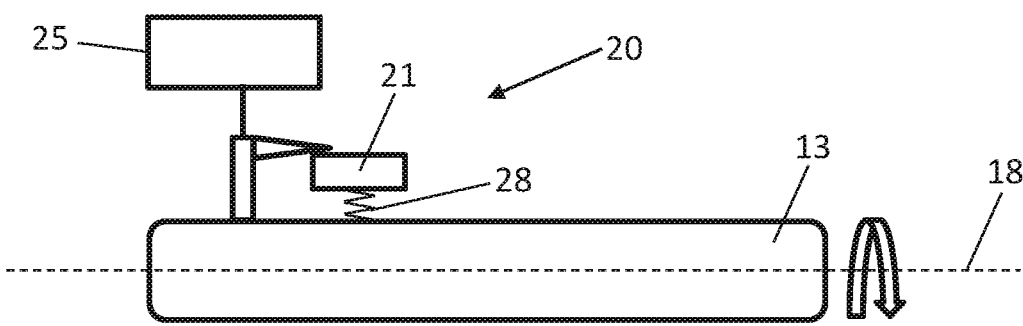
FIG. 11a shows a detuner system having a mass on a spring held by a latch.
Figure 11B:
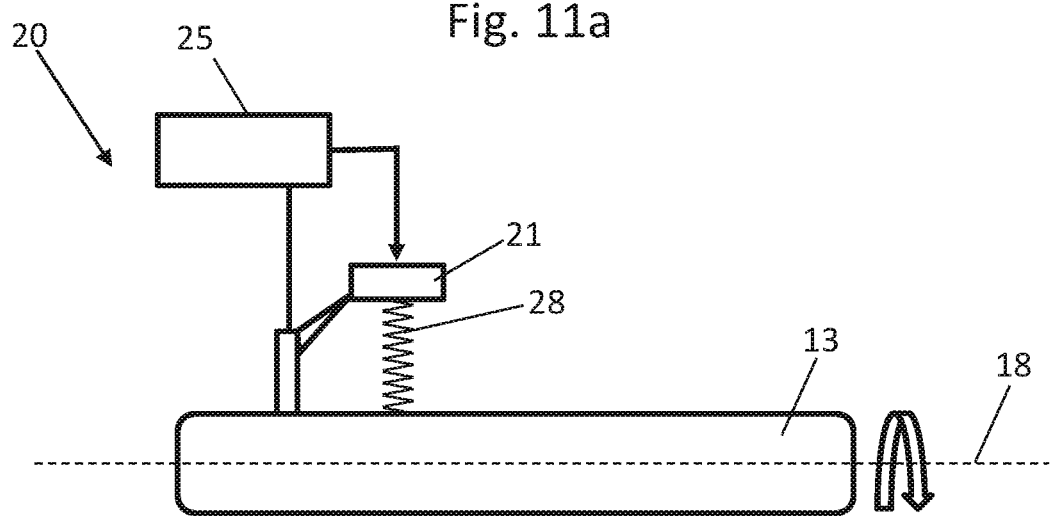
FIG. 11b shows a detuner system having a mass on a spring released by a latch.

In an alternative example shown in FIGS. 11a and 11b, the controller 25 may include a latch for selectively releasing a mass 21 on a spring 28. The latch 25 holds the mass 21 in a constant radial position relative to the axis of rotation 18 of the output shaft 13 until a particular rotational speed and/or vibrational frequency of the output shaft 13 is reached. The latch 25 may be passively actuated, such that the mass 21 is released at a pre-set condition, or the latch 25 may be actively actuated by the controller 25 by measuring the state of the drive train component and responding at an appropriate rotational speed and/or vibrational frequency value. The controller 25 may then move the mass 21 back towards the axis of rotation, for example the controller may reset the position of the mass 21 back to its original position. The latch 25 may be a spring latch, a magnetic latch, or any other suitable latch known in the art. In this way, the controller may be fully active or may be partially active, partially passive.

Figure 12:
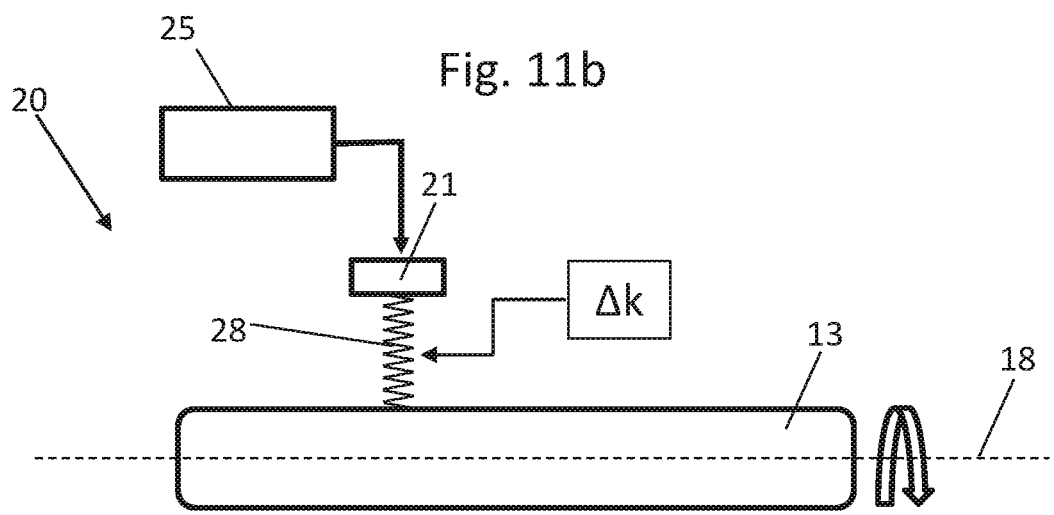
FIG. 12 shows a detuner system having a non-linear spring.

In an example shown in FIG. 12, the spring 28 may be a non-linear spring that is able to control the position of the mass 21. For example, the stiffness of the spring can be controlled by a variable electro-magnetic field (not shown), such that for a limited band of the rotational speed of the output shaft 13 the stiffness of the spring can be reduced to allow radial movement of the mass 21 relative to the axis of rotation 18. The spring may be oriented such that it extends at an angle to the axis of rotation 18. This allows the relative change in the bending natural frequency and torsional natural frequency to be tailored. The controller 25 may then control an actuator to move the mass 21 back towards the axis of rotation, for example to its original position.

Figure 13A:
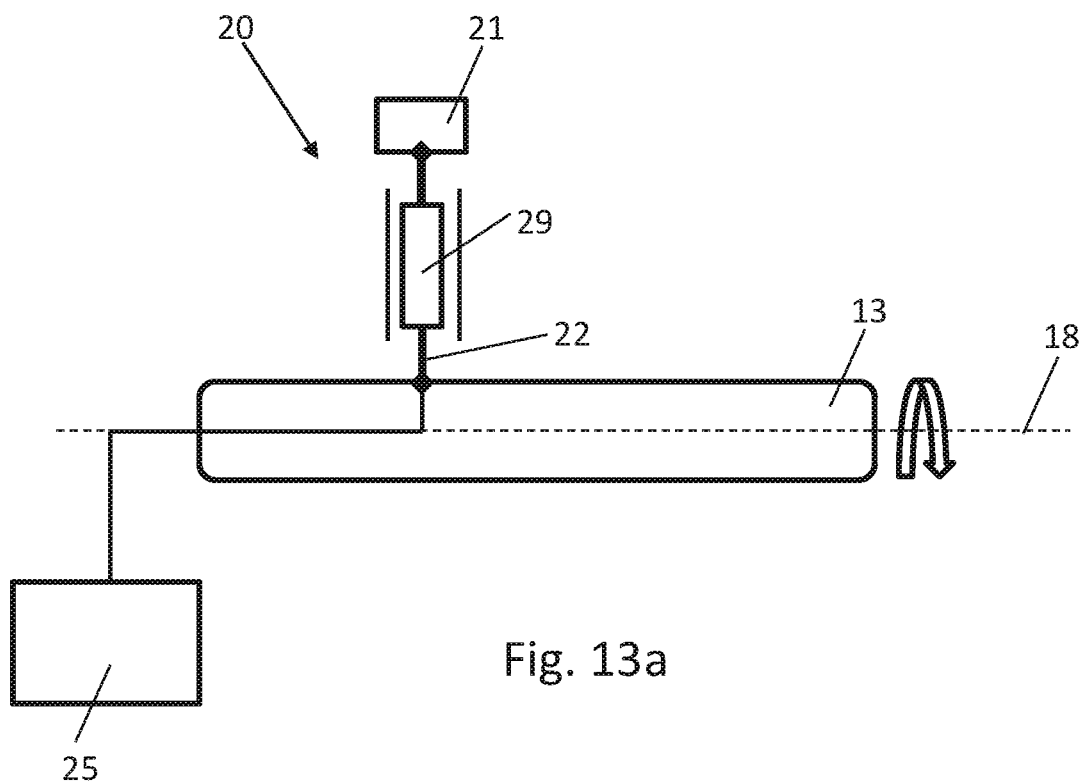
FIG. 13a-b shows a detuner system having a piezo-electric element.
Figure 13B:
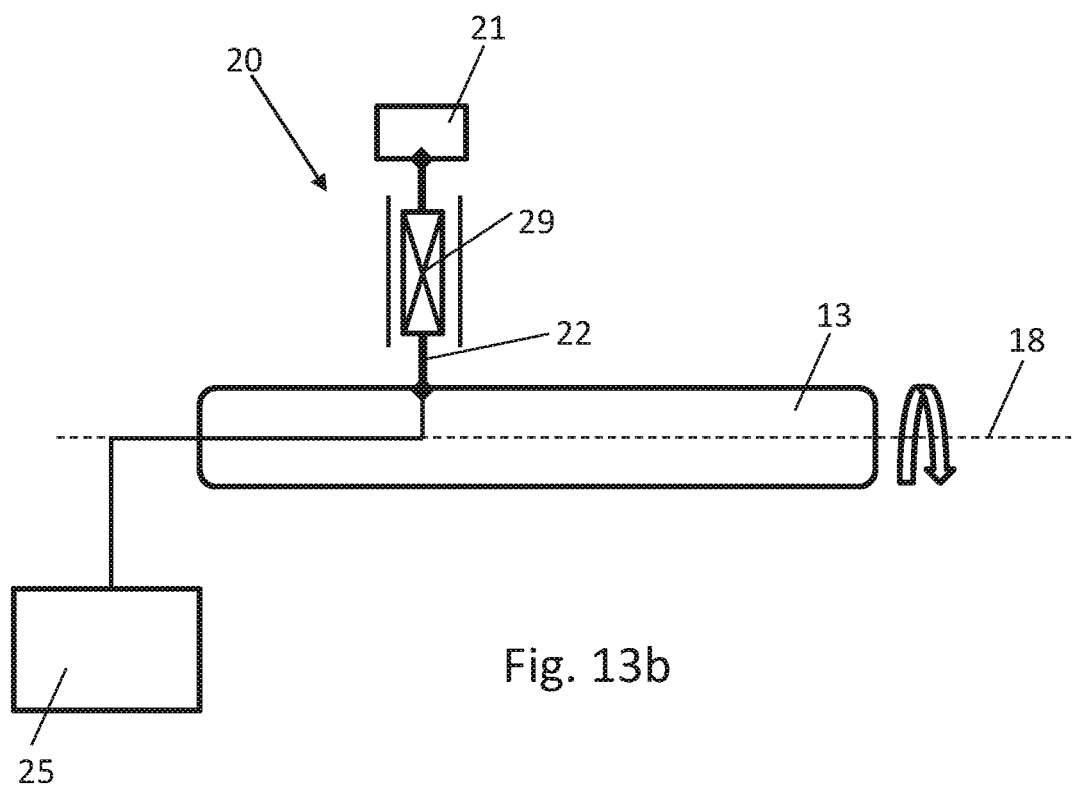

The lever arm 22 extending from the output shaft 13 to the mass 21 may include a piezoelectric element 29, as shown in FIG. 13a. The piezoelectric element 29 allows the stiffness of the lever arm 22 to be changed. A controller 25 can be used to control the application of electric current to the piezoelectric element 29 in order to provide the change in stiffness of the lever arm 22, as shown in FIG. 13b. The effect of the change in stiffness is to change the inertial properties of the output shaft 13 and alter the natural frequency, such that the natural frequency of the drive train component (in this case an output shaft 13) may be changed for a limited band of the operational speed range.

Figure 14A:
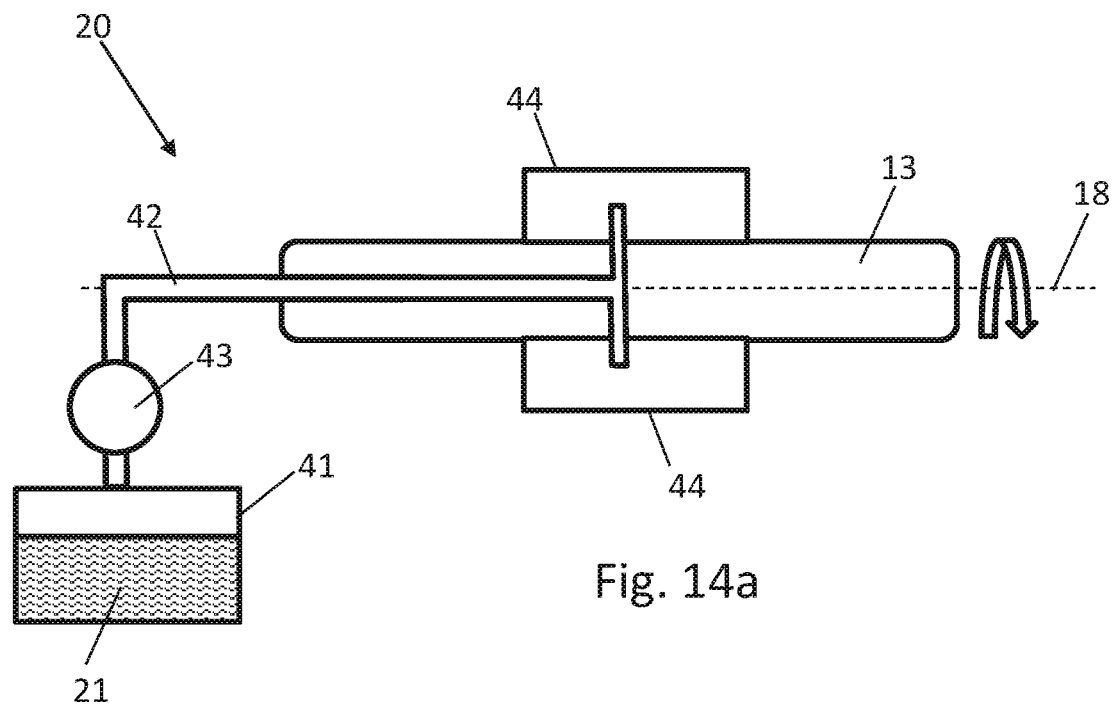
FIG. 14a-b shows a detuner system having oil supplied to a cavity on an output shaft.
Figure 14B:
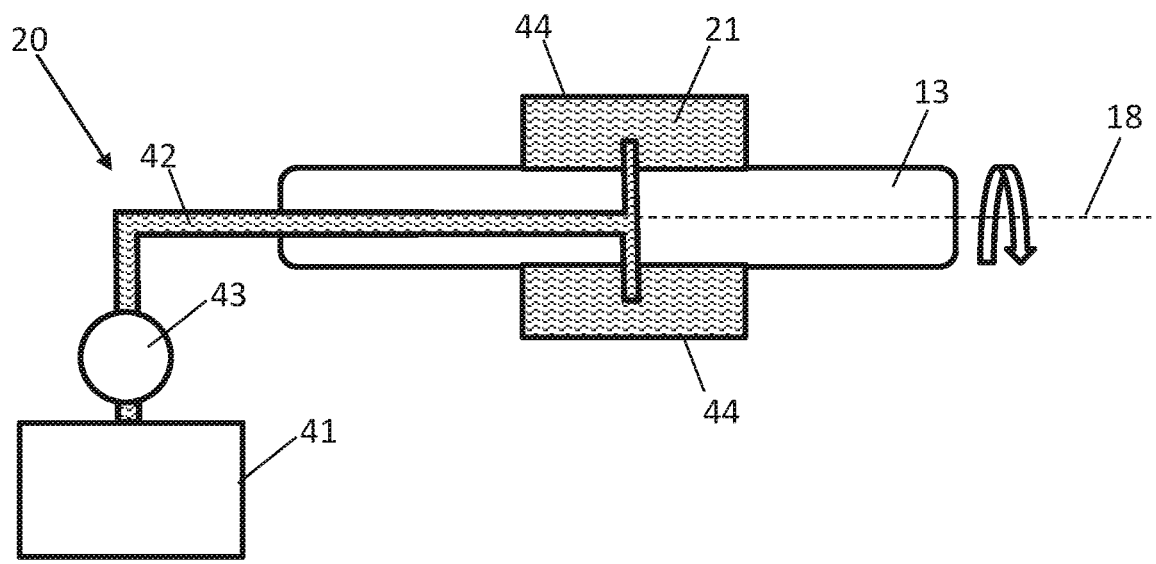

In an alternative example the mass 21 may be a liquid, such as oil. The liquid may be pumped relative to one or more drive train components to change the natural frequency of the drive train components. FIGS. 14a and 14b show an example in which oil 21 is held in an oil reservoir 41 until a lower bound 33 of the rotational speed range of the output shaft is reached. Oil 21 is then pumped along a pipe 42 by a pump 43 into an oil cavity 44 adjacent to the output shaft 13. The effect of displacing the oil relative to the output shaft 13 is to cause the natural frequency of the output shaft 13 to be altered. At an upper bound 34 of the rotational speed range the oil 21 may then be pumped back along the pipe 42 by the pump 43 into the oil reservoir 41, such that the natural frequency of the output shaft 13 returns to its starting value.

The pump may be an oil lubrication pump. The oil may also be part of an oil lubrication system. A controller (not shown) is used to control a valve that determines the flow of oil that is pumped relative to one or more of the drive train components. The controller may include one or more pressure relief valves that determine the liquid pressure at which the liquid is moved from the reservoir 41 to the oil cavity 44.

The controller 25 may be linked to the main control system of the wind turbine. The controller 25 may communicate with the main control system of the wind turbine. Alternatively the controller 25 may be separate and independent of the main control system of the wind turbine.

The detuner system 20 may be suitably mounted or integrated into many components of the drive train 10, for example, the input shaft 11, the gearbox 12 (or one or more of its gears), the output shaft 13, the brake 14, the auxiliary shaft 15, the generator 16, the non-drive end of the generator, or any other suitable component known in the art.

It may be positioned within one of these components or at the interface between one or more of them. The detuner system 20 may be suitably positioned within the drive train 10 to cancel vibrational modes by counter phase vibrations. For example, by changing the natural frequency of one drive train component such that the vibrations counter the vibrations of an adjacent drive train component.

It will be clear that there may be one limited band of the rotational speed, or alternatively more than one limited band of the rotational speed. wherein the speed range defined by each respective limited band may be smaller or larger than each other limited band of the rotational speed. For example a second limited band may be larger or smaller than a first limited band. Outside of the limited bands of the rotational speed range the natural frequency of the drive train component is left substantially unchanged.

The position of the mass 21 relative to the drive train component and/or the stiffness of the lever arm 22 may be the same at rotational speeds above and below the limited band of the rotational speed range. Alternatively, the relative position of the mass 21 relative to the drive train component and/or the stiffness of the lever arm 22 may be different above the rotational speed range than below the rotational speed range, although in both cases the position of the mass 21 and/or stiffness of the lever arm 22 will be substantially constant at rotational speeds outside of the limited band.

The detuner system 20 may be configured to change the torsional and/or bending natural frequency of the drive train component. The detuner system 20 may be configured to control the relative changes of the torsional natural frequency and bending natural frequency, such that in a first configuration the torsional natural frequency is increased by more than the bending natural frequency, and in a second configuration the bending natural frequency is increased more than the torsional natural frequency. The proportional changes of the bending and torsional natural frequencies may be controlled.

The natural frequency of the drive train component may be increased and/or decreased. The natural frequency may be maintained between the first and second thresholds of the rotational speed range. The natural frequency of the drive train component below the first threshold of the rotational speed range and/or above the second threshold of the rotational speed range may be constant.

The limited band of the rotational speed range of the drive train component may be predetermined prior to operation. In this case, the limited band of the rotational speed range, defined between a lower bound 33 and an upper bound 34 of the rotational speed range of the drive train component, may be equally spaced apart from the expected position of the resonant frequency. Alternatively, the natural frequency may be closer to the upper 34 or lower 33 bound of the limited band of the rotational speed range.

The limited band of the rotational speed range of the drive train component may be predetermined based on a threshold vibrational amplitude of the rotating drive train component. The vibrational amplitude may be actively measured. The detuner system 20 may predict the onset of a resonant frequency based on a measured vibrational response. There may be one or more vibrational frequency amplitudes.

In the examples shown, the actuator 22 is a rotary actuator. In alternative examples, the actuator 22 may be a linear actuator. In this case the actuator may be oriented such that the mass 21 moves only radially from the axis of rotation 18, or the mass 21 moves only axially along the axis of rotation 18, or combines both radial and axial movement of the mass 21.

The spring 28 may be an axially extending spring or a torsional spring.

Although the invention has been described above with reference to one or more preferred embodiments, it will be appreciated that various changes or modifications may be made without departing from the scope of the invention as defined in the appended claims.

The invention claimed is:

1. A system for a wind turbine, comprising:
   a detuner system;
   a drive train component having a natural frequency and configured to rotate about an axis of rotation at a range of different speeds; and
   a controller for selectively interacting with the drive train component via the detuner system,
   wherein the controller is configured to cause a step change in the natural frequency of the drive train component above a first threshold of the rotational speed range via the detuner system, and to cause a step change in the natural frequency of the drive train component below a second threshold of the rotational speed range via the detuner system,
   wherein the rotational speed at the second threshold is different to the rotational speed at the first threshold.

2. The system for the wind turbine according to claim 1, wherein the controller is configured to cause a change in the natural frequency by altering one or more of the: mass, mass moment, stiffness, and/or damping of a portion of the drive train component.

3. The system for the wind turbine according to claim 1, wherein the natural frequency of the drive train component below the first threshold of the rotational speed range and/or above the second threshold of the rotational speed range is constant.

4. The system for the wind turbine according to claim 1, wherein the first threshold and/or second threshold of the rotational speed range is configured to be determined prior to rotating the drive train component.

5. The system for the wind turbine according to claim 1, wherein the first threshold and/or second threshold of the rotational speed range is configured to be determined based on a threshold vibrational amplitude of the rotating drive train component.

6. The system for the wind turbine according to claim 5, further comprising two or more threshold vibrational amplitudes of the rotating drive train component.

7. The system for the wind turbine according to claim 1, wherein a limited band of the rotational speed is defined between the first threshold and the second threshold of the rotational speed range, and further comprising two or more limited bands of the rotational speed range.

8. The system for the wind turbine according to claim 1, wherein the detuner system further comprises a mass for interacting with the drive train component, wherein the controller is configured to enable movement of the mass relative to the drive train component.

9. The system for the wind turbine according to claim 8, wherein the mass is configured to move radially with respect to the axis of the drive train component.

10. The system for the wind turbine according to claim 8, wherein the mass is configured to move axially along the axis of the drive train component.

11. The system for the wind turbine according to claim 8, wherein a position of the mass relative to the drive train component at a speed below the first threshold of the rotational speed and at a speed above the second threshold of the rotational speed is substantially the same.

12. The system for the wind turbine according to claim 8, wherein the mass is a solid or a liquid.

13. The system for the wind turbine according to claim 1, wherein the natural frequency is a torsional natural frequency and/or a bending natural frequency.

14. The system for the wind turbine according to claim 1, further comprising a high-speed shaft and a low-speed shaft, wherein the controller is configured to interact with the high-speed shaft.

15. A wind turbine comprising the system according to claim 1.

16. A method of operating a wind turbine, the wind turbine comprising:
   a detuner system;
   a drive train component having a natural frequency and configured to rotate about an axis; and
   a controller for selectively interacting with the drive train component via the detuner system,
the method comprising:
   rotating the drive train component about the axis at a range of different speeds;
   causing a step change in the natural frequency of the drive train component at a first threshold of the rotational speed range via the detuner system; and
   causing a step change in the natural frequency of the drive train component at a causing a step change in the natural frequency of the drive train component at a second threshold of the rotational speed range different to the first threshold via the detuner system.

* * * * *